(12) United States Patent
Ait-Ameur et al.

(10) Patent No.: US 8,675,662 B2
(45) Date of Patent: Mar. 18, 2014

(54) IPV6 VLAN TAG PACKET TRANSPORT OPTIMIZATION

(75) Inventors: Samir Ait-Ameur, Fremont, CA (US); Emerando M Delos Reyes, Pleasant Hill, CA (US); Benjamin J Parker, Danville, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 498 days.

(21) Appl. No.: 12/637,963

(22) Filed: Dec. 15, 2009

(65) Prior Publication Data

US 2011/0142045 A1  Jun. 16, 2011

(51) Int. Cl.
*H04L 12/54* (2013.01)

(52) U.S. Cl.
USPC .......................................... 370/393; 370/409

(58) Field of Classification Search
USPC ........................................ 370/392, 409, 474
See application file for complete search history.

(56) References Cited

U.S. PATENT DOCUMENTS

| | | | |
|---|---|---|---|
| 6,950,433 B1 * | 9/2005 | Okamoto | 370/392 |
| 7,609,689 B1 * | 10/2009 | Desanti et al. | 370/389 |
| 7,937,438 B1 * | 5/2011 | Miller et al. | 709/203 |
| 2004/0179508 A1 * | 9/2004 | Thubert et al. | 370/349 |
| 2006/0002370 A1 * | 1/2006 | Rabie et al. | 370/351 |
| 2006/0120382 A1 * | 6/2006 | Thubert et al. | 370/395.52 |
| 2007/0127474 A1 * | 6/2007 | Mirtorabi et al. | 370/390 |
| 2008/0037539 A1 * | 2/2008 | Paramaguru | 370/392 |
| 2011/0103394 A1 * | 5/2011 | Vogt et al. | 370/401 |

* cited by examiner

*Primary Examiner* — Dang T Ton
*Assistant Examiner* — Ryan Kavleski

(57) ABSTRACT

A network device receives an Ethernet frame sent from an originating device toward a destination device, determines whether the frame includes an Internet Protocol version 6 (IPv6) payload, and determines whether the frame is one of an ingress frame or an egress frame for a virtual local area network (VLAN). The network device determines a VLAN tag for the frame when the frame is an ingress frame and inserts the VLAN tag in a portion of a source internet protocol (IP) address field or a destination IP address field of the IPv6 payload, when the frame is an ingress frame. The network device extracts a VLAN tag from a portion of the source IP address field or a destination IP address field of the IPv6 payload, when the frame is an egress frame. The frame is then output to one of the VLAN or the destination device.

19 Claims, 9 Drawing Sheets

IPV6 VLAN TAG PACKET TRANSPORT OPTIMIZATION

BACKGROUND

A virtual local area network (LAN) or "VLAN" is a logical subdivision of a Layer 2 network that makes a single Layer 2 infrastructure operate as though it were multiple, separate Layer 2 networks. This is accomplished by adding a numeric tag field (e.g., a VLAN tag) to each data packet as it leaves a Layer 2 switch which identifies the VLAN number to which the packet belongs. Other VLAN-enabled switches honor the VLAN numbering scheme to segregate the network into logical, virtual networks.

Current engineering standards for both IPv6 (Internet Protocol version 6) and Ethernet frame formats place a VLAN tag packet or bytes outside the IPv6 payload. A commonly-accepted protocol used in configuring VLANs is IEEE 802.1Q, which defines a 32-bit long VLAN tag header. One disadvantage of Ethernet frame formats for VLANs, however, is that the VLAN tag headers add additional bandwidth overhead to network communications.

DETAILED DESCRIPTION

The following detailed description refers to the accompanying drawings. The same reference numbers in different drawings may identify the same or similar elements. Also, the following detailed description does not limit the invention.

The term "frame," as used herein, may refer to a frame, a datagram, a packet, or a cell; a fragment of a frame, a fragment of a datagram, a fragment of a packet, a fragment of a cell; or another type, arrangement, or packaging of data.

Implementations described herein may include systems and/or methods that may reduce the standard packet size of an IPv6 based Ethernet frame by embedding a VLAN tag packet into the destination and/or source IP addresses of an IPv6 payload. More particularly, a network device, such as an edge switch or another network device, may receive an Ethernet frame sent from an originating device toward a destination device, may determine whether the frame includes an IPv6 payload and whether the frame is one of an ingress frame or an egress frame for the VLAN. When the frame is an ingress frame, the network device may select an appropriate VLAN tag for the frame and may insert the VLAN tag in a portion the IPv6 payload, such as a source IP address field or a destination IP address field of the IPv6 payload. When the frame is an egress frame, the network device may extract the VLAN tag from a portion of the IPv6 payload (e.g., from either the source IP address field or destination IP address field). The network device may then output the frame to the VLAN (e.g., if the frame is an ingress frame) or to the destination device (e.g., if the frame is an egress frame).

The network devices on the VLAN may coordinate with one another to store the VLAN tag in the IPv6 payload in such a way that IPv6 payload information is not lost. The dynamics involved in embedding and extracting the VLAN tags from the IPv6 payload may still be performed at the Ethernet layer but with the new parsing of the location of the VLAN tag inside the IPv6 payload (as opposed to parsing the VLAN tag next to the EtherType payload as commonly practiced).

Figure 1:
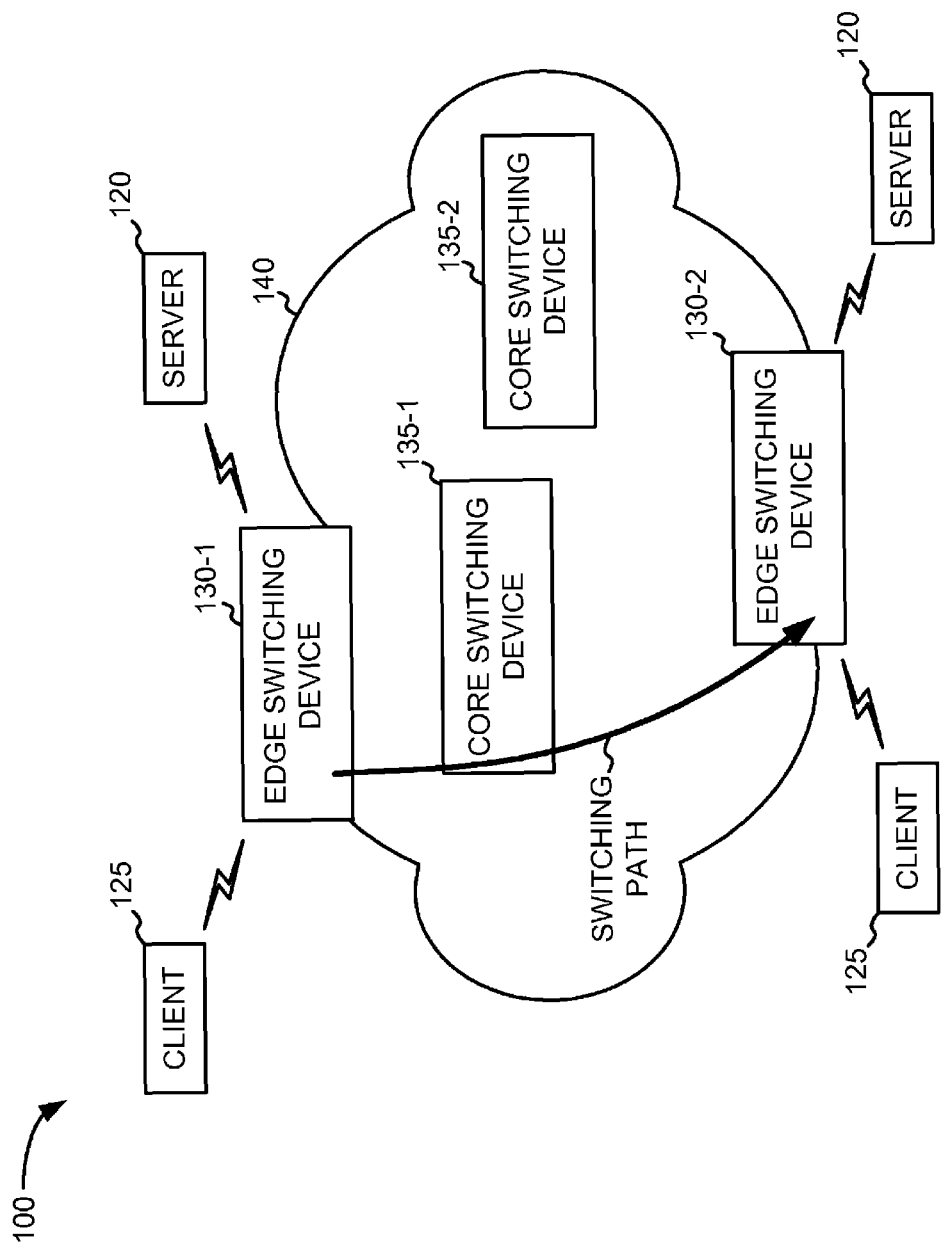
FIG. 1 is a diagram of an exemplary environment in which concepts described herein may be implemented.

FIG. 1 is a diagram of an exemplary environment 100 in which concepts described herein may be implemented. Environment 100 may include multiple entities, such as one or more servers 120 and one or more clients 125. Servers 120 may include one or more computing devices designed to provide information to or otherwise interact with clients 125. Similarly, clients 125 may each include one or more computing devices designed to interact with and obtain content from servers 120 or with/from other clients 125. Servers 120 and clients 125 may act as originating devices when sending data, and as destination devices when receiving data.

Servers 120 and clients 125 and may communicate via a network 140. Network 140 may include, for example, a local area network (LAN), a private network (e.g., a company intranet), a wide area network (WAN), a metropolitan area network (MAN), or another type of network. In one implementation, network 140 may include a switched network that provides point-to-point and multi-point services, a network capable of using a VLAN, etc. When network 140 operates as a VLAN, a numeric tag field (e.g., a VLAN tag identifying a VLAN number to which the frame belongs) may be added to each frame as it leaves an ingress edge switch (e.g., edge switching device 130-1).

Network 140 may include a number of network devices, such as edge switching devices 130-1 and 130-2 (referred to herein collectively as "edge switching devices 130"), and core switching devices 135-1 and 135-2 (referred to herein collectively as "core switching devices 135"). Edge switching devices 130 may generally function to connect devices, such as clients 125 or servers 120 to network 140. Core switching devices 135 may function to transmit data between other switches within network 140. In an exemplary implementation, each of edge switching devices 130 and core switching devices 135 may include a gateway, a router, a firewall, a network interface card (NIC), a hub, a bridge, a proxy server, an optical add-drop multiplexer (OADM), or other data transfer devices.

Edge switching devices 130 may implement edges (i.e., ingress and egress points) for VLAN connections. Edge switching devices 130 may serve as entry points to a VLAN when receiving data from an originating device and may serve exit points from the VLAN when forwarding data to a destination device. For example, as shown in FIG. 1, incoming (ingress) frames may be received at edge switching device 130-1, which may add a VLAN tag onto the frame. The frame may then be switched through network 140 based on the VLAN tag. Edge router 130-2 may act as the egress point for the VLAN. Edge switching device 130-2 may remove the VLAN tag from the frame before forwarding the frame to the destination device (e.g., client 125 or server 120).

Although, FIG. 1 illustrates exemplary components of environment 100, in other implementations, environment 100 may include additional, fewer, different, or differently arranged components than those illustrated in FIG. 1 and described herein.

Figure 2:
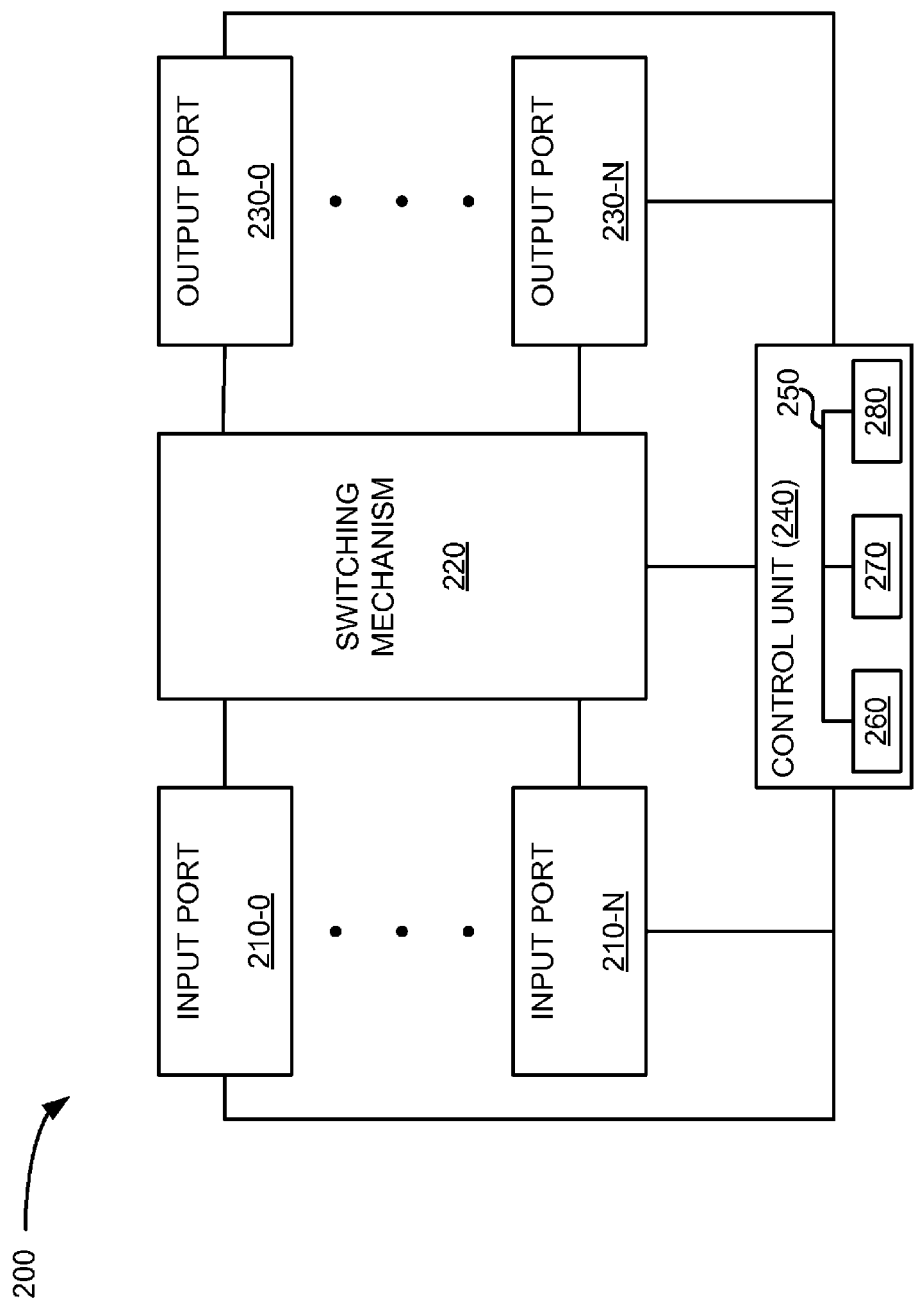
FIG. 2 is a diagram illustrating exemplary components of a network device of FIG. 1.

FIG. 2 is a diagram illustrating exemplary components of a network device 200. Network device 200 may correspond to, for example, one or more of edge switching devices 130 or core switching devices 135 of FIG. 1. Device 200 may include input ports 210, a switching mechanism 220, output ports 230, and a control unit 240. Input ports 210 may be the point of attachment for a physical link (not shown) and may be the point of entry for incoming frames. Switching mechanism 220 may interconnect input ports 210 with output ports 230. Output ports 230 may store frames and may schedule frames for service on an output link (not shown). Control unit 240 may use routing protocols and one or more forwarding tables.

Input ports 210 may carry out data link layer encapsulation and decapsulation. Input ports 210 may look up a destination address of an incoming frame in a forwarding table to determine its destination port (i.e., route lookup). In other implementations, input ports 210 may be ports that send (e.g., may be an exit point) and/or receive (e.g., may be an entry point) frames.

Switching mechanism 220 may be implemented using many different techniques. For example, switching mechanism 220 may include busses, crossbars, and/or shared memories. The simplest switching mechanism 220 may be a bus that links input ports 210 and output ports 230. A crossbar may provide multiple simultaneous data paths through switching mechanism 220. In a shared-memory switching mechanism 220, incoming frames may be stored in a shared memory and pointers to frames may be switched.

Output ports 230 may store frames before they are transmitted on an output link (not shown). Output ports 230 may support data link layer encapsulation and decapsulation, and/or a variety of higher-level protocols. In other implementations, output ports 230 may send (e.g., may be an exit point) and/or receive (e.g., may be an entry point) frames.

Control unit 240 may interconnect with input ports 210, switching mechanism 220, and output ports 230. Control unit 240 may compute a forwarding table, implement routing protocols, and/or run software to configure and manage network device 200. Control unit 240 may handle any frame whose destination address may not be found in the forwarding table.

In one implementation, control unit 240 may include a bus 250 that may include a path that permits communication among a processor 260, a memory 270, and a communication interface 280. Processor 260 may include a microprocessor or processing logic that may interpret and execute instructions. Memory 270 may include a random access memory (RAM), a read only memory (ROM) device, a magnetic and/or optical recording medium and its corresponding drive, and/or another type of static and/or dynamic storage device that may store information and instructions for execution by processor 260. Communication interface 280 may include any transceiver-like mechanism that enables control unit 240 to communicate with other devices and/or systems.

As described herein, device 200 may perform certain operations in response to processor 260 executing software instructions contained in a computer-readable medium, such as memory 270. A computer-readable medium may be defined as a physical or logical memory device. A logical memory device may include memory space within a single physical memory device or spread across multiple physical memory devices. The software instructions may be read into memory 270 from another computer-readable medium or from another device via communication interface 280. The software instructions contained in memory 270 may cause processor 260 to perform processes described herein. Alternatively, hardwired circuitry may be used in place of or in combination with software instructions to implement processes described herein. Thus, implementations described herein are not limited to any specific combination of hardware circuitry and software.

Although network device 200 is described above as corresponding to an edge switching device 130 or core switching device 135, in other implementations, network device 200 may generally be implemented as a switch or a router that performs other functions in network 140. Network device 200 may also potentially be implemented as a device installed locally at a location of client 125 or server 120. While FIG. 2 shows exemplary components of network device 200, in other implementations, network device 200 may contain fewer, different, differently arranged, or additional components than depicted in FIG. 2. Alternatively, or additionally, one or more components of network device 200 may perform one or more other tasks described as being performed by one or more other components of network device 200.

Figure 3A:
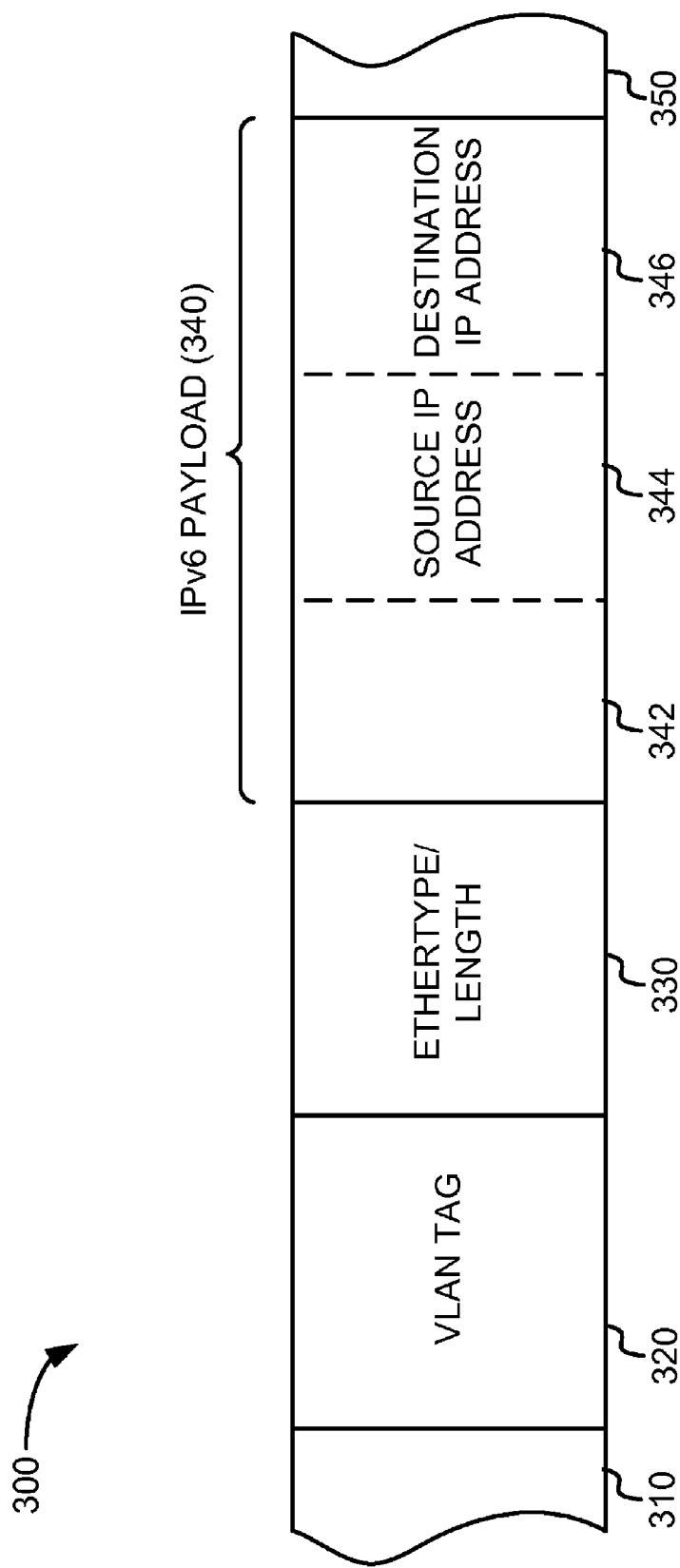
FIGS. 3A-3D are diagrams illustrating formats of Ethernet frame portions.

FIG. 3A is a diagram illustrating the format of a portion 300 of an Ethernet frame as conventionally implemented. For example, portion 300 may include a sequence of fields in accordance with IEEE 802.1Q standards. Portion 300 may include leading frame information 310, a VLAN tag field 320, an EtherType/length field 330, an IPv6 payload field 340, and trailing frame information 350.

Leading frame information 310 may include fields for an original Ethernet frame, such as a preamble field, a start-of-frame delimiter (SFD), a destination media access control (MAC) address field, and a source MAC address field.

VLAN tag 320 may include a 32-bit field between leading frame information 310 (e.g., a source MAC address field) and EtherType/length field 330. VLAN tag 320 may include, for example, a 16-bit a tag protocol identifier (TPID) field, a 3-bit priority code point (PCP) field, a 1-bit canonical format indicator (CFI) field, and a 12-bit VLAN identifier (VID) field.

EtherType/length field 330 may include a field to indicate which protocol is encapsulated in payload field 340. For example, EtherType/length field 330 may include an EtherType indicator (e.g., "0x86DD") to correspond to IPv6 payload field 340.

IPv6 payload field 340 may include the payload for Ethernet frame 300. IPv6 payload field 340 may generally include a header portion, which has control information used to deliver the payload data to its final destination, and a payload portion. The header portion may particularly include, among other fields, initial fields 342, a source IP address field 344 and a destination IP address field 346. Initial fields 342 may include a version field, a traffic class field, a flow label field, a payload length field, a next header field, and a hop limit field. Source IP address field 344 and destination IP address field 346 may each include 128-bit address fields. A 128-bit field can theoretically define $2^{128}$ unique addresses. IPv6 payload field 340 may be a variable length field.

Trailing frame information 350 may include a 4-bit frame check sequence (FCS) field and/or and interframe gap.

Consistent with aspects described herein, an Ethernet frame that includes a VLAN tag 320 may be constructed so that the VLAN tag 320 is embedded within source IP address 344, destination IP address 346, or both. Edge switching devices (e.g., network device 200) may take advantage of the 128 bit long IPv6 addressing size and may insert the 32 bit long VLAN tag into either source IP address field 344 or destination IP address field 346 of IPv6 payload 340. Accordingly, the size of the Ethernet frame can be reduced, potentially improving the useful bandwidth of network 140. For example, systems and/or methods described herein may reduce the transport overhead required to carry simple VoIP or other types of application packets across network nodes.

Figure 3B:
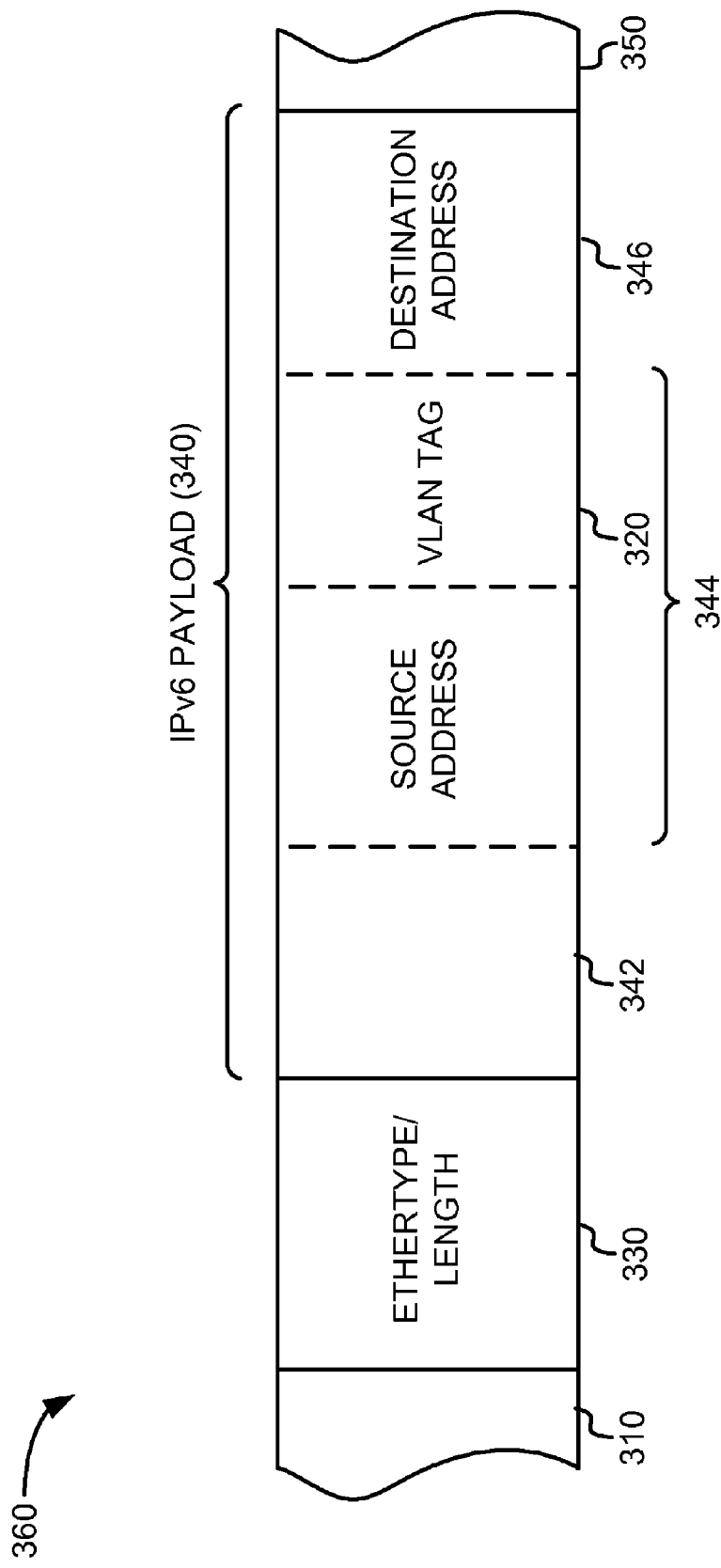
Figure 3C:
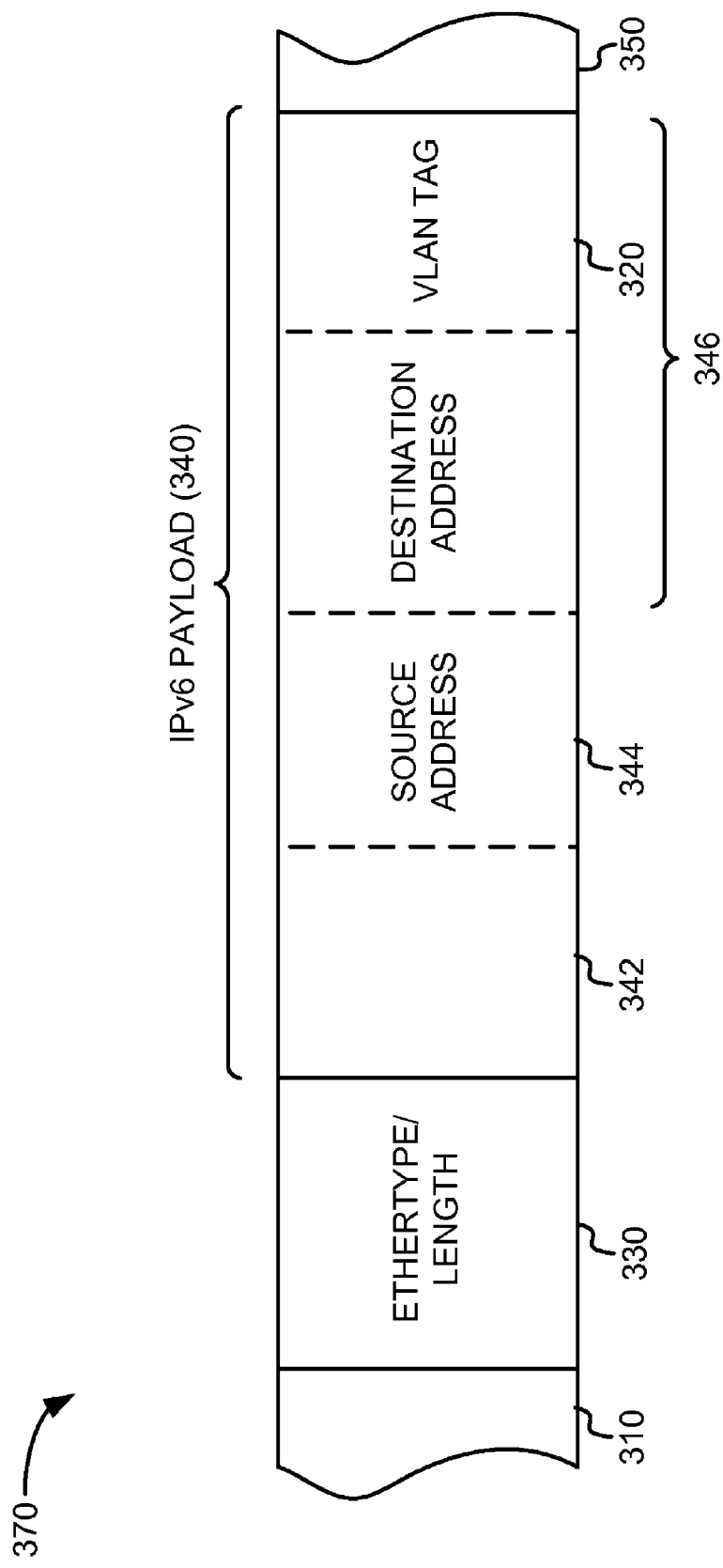
Figure 3D:
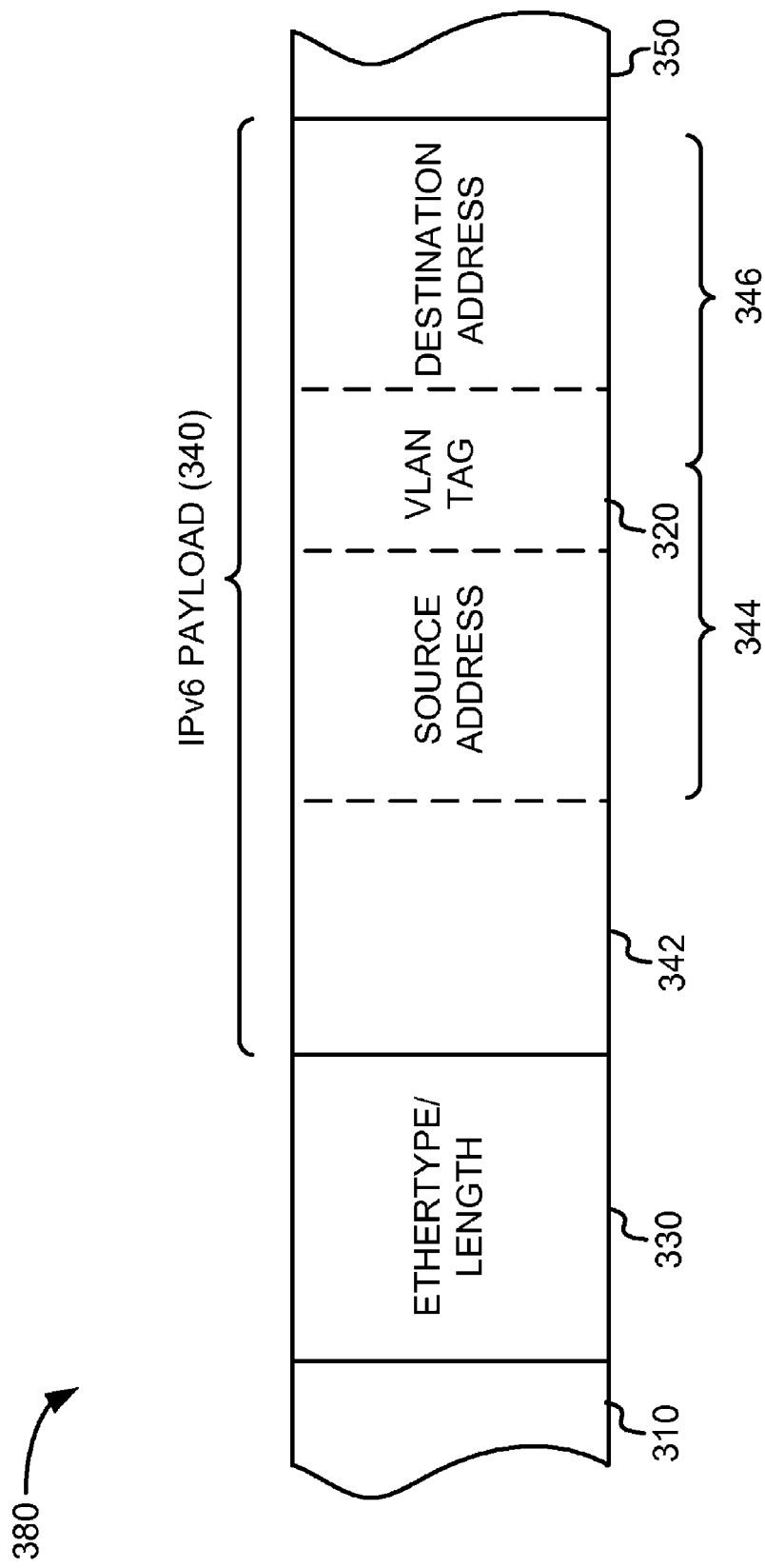

FIGS. 3B-3D are diagrams illustrating an exemplary Ethernet frame portions, formatted consistently with aspects described herein. As shown in FIG. 3B, a frame portion 360 may include IPv6 payload 340 in which VLAN tag 320 is embedded in source IP address field 344. Alternatively, as shown in FIG. 3C, a frame portion 370 may include IPv6 payload 340 in which VLAN tag 320 is embedded in destination IP address field 346. Alternatively, as shown in FIG. 3D, a frame portion 380 may include IPv6 payload 340 in which VLAN tag 320 is placed partially in both source IP address field 344 and destination IP address field 346. For example, VLAN tag 320 may be equally split in which 16 bits are stored in source IP address field 344 and 16 bits are stored in destination IP address field 346.

Figure 4:
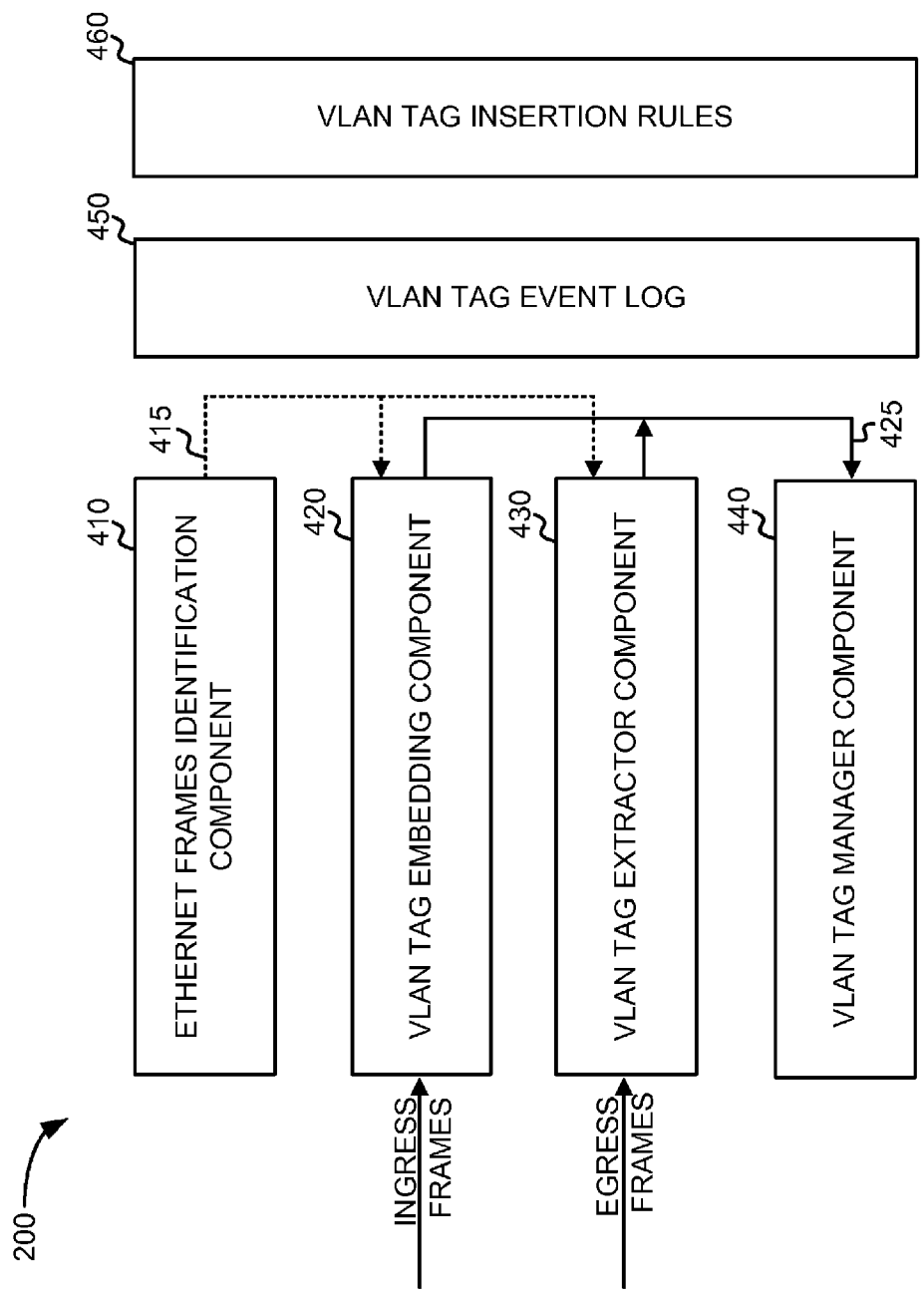
FIG. 4 is a diagram illustrating exemplary functional components in a network device of FIG. 1.

FIG. 4 is a diagram illustrating exemplary functional components of network device 200. In some implementation, one or more functions described in connection with FIG. 4 may be performed by one or more components of network device 200 (FIG. 2). For example, the elements shown in FIG. 4 may be implemented in input port 210 and/or output port 230 of a network device 200 acting as an edge switching device 130.

As shown in FIG. 4, network device 200 may include an Ethernet frames identification component 410, a VLAN tag embedding component 420, a VLAN tag extractor component 430, a VLAN tag manager component 440, a VLAN tag event log 450, and VLAN tag insertion rules 460.

Ethernet frames identification component 410 may include hardware or a combination of hardware and software to identify IPv6 Ethernet frames that may utilize VLAN tags embedded in a source IP address field or a destination IP address field of an IPv6 payload. For example, Ethernet frames identification component 410 may load Ethernet frames for IPv6 packets and may parse the data field adjacent to Ethernet source MAC address field (e.g., EtherType/length field 330). Ethernet frames identification component 410 may then check if the Hex decimal content in that field is that of an IPv6 payload type (e.g., "0x86DD"). If Ethernet frames identification component 410 identifies that an IPv6 payload type is present, Ethernet frames identification component 410 may forward the IPv6 based Ethernet frame to VLAN tag embedding component 420 or VLAN tag extractor component 430, as illustrated by control line 415. If Ethernet frames identification component 410 does not identify that an IPv6 payload type is present in a particular frame, Ethernet frames identification component 410 may skip the frame and move on to the next frame.

VLAN tag embedding component 420 may include hardware or a combination of hardware and software to receive frames forwarded from Ethernet frames identification component 410 and to insert a 32-bit long VLAN tag (e.g., VLAN tag 320) into source IP address field 344 and/or destination IP address field 346. In one implementation, VLAN tag embedding component 420 may include or communicate with a loading component that receives and stores a plurality of VLAN tags that are to be used to create VLANs in network 140. The VLAN tags may be inserted, for example, according to insertion rules included in VLAN tag insertion rules 460. VLAN tag embedding component 420 may insert an indicator to indicate that embedding of a VLAN tag has occurred. The indicator may facilitate the parsing of VLAN tags by subsequent components (e.g., VLAN tag extractor component 430 of a different network device 200) without necessarily processing IP layer data fields. In one implementation, the indicator may take the form of a flipped bit, where VLAN tag embedding component 420 may flip the left most bit from a zero ("0") to a one ("1"). This single bit may precede the 32-bit long VLAN tag payload to indicate that an embedding of a VLAN tag has occurred. VLAN tag embedding component 420 may forward the IPv6 based Ethernet frame to VLAN tag manager component 440, as illustrated by control lines 425.

VLAN tag extractor component 430 may include hardware or a combination of hardware and software to identify IPv6 Ethernet frames that may utilize VLAN tags embedded in a source IP address field or a destination IP address field of an IPv6 payload. For example, VLAN tag extractor component 430 may parse all incoming IPv6 Ethernet frames by looking up the indicator (e.g., applied by VLAN tag embedding component 420 of a different network device 200) that embedding of a VLAN tag has occurred. VLAN tag extractor component 430 may remove previously inserted VLAN tags from the source IP address or destination IP address (e.g., source IP address field 344 and/or destination IP address field 346). The VLAN tag may be extracted, for example, according to rules included in VLAN tag insertion rules 460. VLAN tag extractor component 430 may "repair" the source or destination address used to hold the VLAN tag so that the source and destination addresses match the original address for the packet (i.e., the address that would be included in the source/destination IP address fields if the VLAN tag had been inserted separately within the Ethernet Frame instead of inserted into the source/destination IP address fields). VLAN tag extractor component 430 may then forward the frames to VLAN tag manager component 440, as indicated by control lines 425.

VLAN tag manager component 440 may include hardware or a combination of hardware and software to receive an IPv6 Ethernet frame with embedded VLAN tags (e.g., from VLAN tag embedding component 420) or an IPv6 Ethernet frames with the VLAN tags extracted (e.g., from VLAN tag extractor component 430). VLAN tag manager component 440 may interface with an Ethernet layer interface of another network element or computing device to forward the IPv6 Ethernet frame. VLAN tag manager component 440 may represent, for example, a port or other output link for a network device. Alternatively, VLAN tag manager component 440 may represent an interface for a next processing section within network device 200.

VLAN tag event log 450 may include one or more computer-readable media in which events at Ethernet frame loading component 410, VLAN tag embedding component 420, VLAN tag extractor component 430, and/or VLAN tag manager component 440 may be logged. The logged events may be viewed and analyzed by network administrators or network device 200. VLAN tag event log 450 may be used, for example, to implement troubleshooting of network device 200 or for other reasons in which a record of the activities of network device 200 may be needed. In one implementation, VLAN tag event log 450 may use the logged events to provide an error correction mechanism to VLAN tag embedding component 420 and/or VLAN tag extractor component 430 to more accurately and optimally process VLAN tag packets.

VLAN tag insertion rules 460 may include one or more computer-readable media in which rules or protocols that define how VLAN tags may be inserted and extracted from the destination or source IPv6 address fields of the Ethernet frames. In one implementation, the insertion rules may be manually configured by a network administrator. The network administrator may configure the insertion rules at each network device (e.g., edge switching device 130) that may insert/extract the VLAN tags or, in some implementations, different edge switching devices 130 may automatically distribute the insertion rules to other edge switching devices using a network discovery protocol. In other possible implementations, edge switching devices 130 may automatically agree on the insertion rules based on the status of network 140 or the insertion rules may be pre-programmed into each edge switching device 130. In general, the insertion rules at each edge switching device 130 should be consistent with one another.

VLAN tag insertion rules 460 may define the location at which the VLAN tags are inserted into the source and destination IP address fields, the encoding of the inserted VLAN tags (if any), and the encoding of the source and destination IP address fields (if any). The insertion rules may also define, for example, which VLAN tags are to be processed by embedding and extracting the labels in source or destination IP address fields. Other VLAN tags may be conventionally processed, i.e., by inserting the VLAN tag separately into the IPv6 Ethernet frame. VLAN tag insertion rules 460 are described further in connection with, for example, FIG. 5.

Although FIG. 4 shows exemplary functional components of network device 200, in other implementations, network device 200 may contain fewer, different, differently arranged, or additional functional components than depicted in FIG. 4. Additionally, or alternatively, one or more functional components of network device 200 may perform one or more other tasks described as being performed by one or more other functional components of network device 200.

Figure 5:
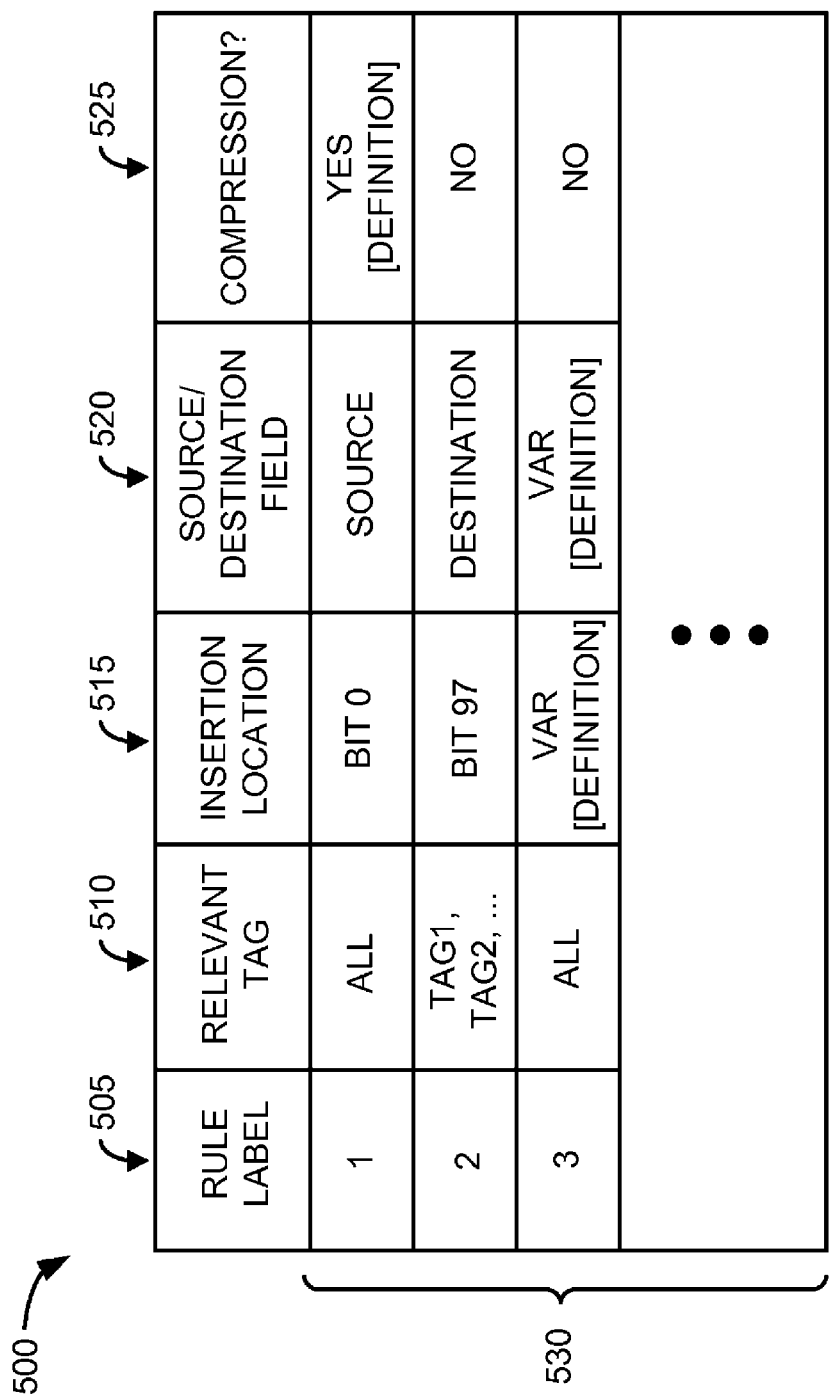
FIG. 5 is a diagram of a table illustrating exemplary insertion rules that may be defined for VLAN tags.

FIG. 5 is a diagram of a table 500, such as a table stored in computer-readable media of network device 200, illustrating exemplary insertion rules that may be defined for VLAN tags. Table 500 may include a rule label field 505, a relevant tag field 510, an insertion location field 515, a source/destination field 520, a compression field 525, and a variety of records or entries 530 associated with fields 505-525. Each row of table 500 may correspond to a VLAN tag insertion rule that may be used by network devices 200.

Rule label field 505 may store a key or label used to identify a VLAN tag insertion rule. In FIG. 5, increasing numeric labels (e.g., 1, 2, 3) are illustrated. Other labels could alternatively be used.

Relevant tag field 510 may define the particular VLAN tags to which the rule applies. For example, rule "1" in table 500 may be relevant to "ALL" tags, indicating that, when rule "1" is enabled, all VLAN tags received by network device 200 are to be processed based on this rule. Rule "2" includes a list of particular VLAN tags to which rule "2" applies. Thus, rule "2" may indicate that when this rule is enabled, only VLAN tags that match the tags in relevant tag field 510 may be processed according to this rule. Other VLAN tags may be processed according to other rules or based on conventional VLAN tag processing.

Insertion location field 515 may indicate the location within the IPv6 address field (e.g., source IP address field 344 or destination IP address field 346) that the VLAN tag is to be embedded. Insertion location field 515 may be defined with, for example, a bit position value. Rule "1" of table 500, for example, indicates that the VLAN tag is to be inserted at bit zero, while rule "2" indicates that the VLAN tag is to be inserted at bit 97. Rule "3" indicates that the insertion location is variable ("VAR"). A variable insertion location may mean that the insertion location may change based on the IPv6 payload or based on other information, such as the network state. The particular location to use may be defined based on a deterministic technique, labeled as "[DEFINITION]" in FIG. 5. This may indicate that the particular technique to use may be defined or referenced in field 515. As one example of such a deterministic technique, consider an insertion procedure in which the VLAN tag may be inserted at either bit zero or bit 96 of an IPv6 address field. Network device 200 may determine which of these locations the VLAN tag is actually inserted at by, for example, examining each of the possible positions and determining whether a valid tag is included in the possible positions.

Source/destination field 520 may indicate whether the VLAN tag is inserted in a source IP address field (e.g., source IP address field 344) or a destination IP address field (e.g., destination IP address field 346). Rule "1," for instance, indicates that the VLAN tag is to be inserted in the source IP address field, and rule "2" indicates that the VLAN tag is to be inserted in the destination IP address field. In some implementations, the VLAN tag may be inserted in either the source IP address field or the destination IP address field, as indicated by rule "3" ("VAR"). This may mean that the insertion field may change based on the packet or based on other information, such as the network state. The particular location to use may be defined based on a deterministic technique, labeled as "[DEFINITION]" in FIG. 5. For example, if network device 200 inserts the VLAN tag into the source IP address field, network device 200 may flip the first bit located either to the left most or the right most of the inserted VLAN tag. The first bit may be used to flag whether the label is inserted in the source IP address field or the destination IP address field.

Compression field 525 may indicate any additional processing that may be performed on the VLAN tag and/or the source/destination IP address field in order to ensure address information is not overwritten in the source/destination IP address fields. In some situations, compression field 525 may indicate additional processing is not necessary, such as in rules "2" and "3." This situation may correspond to one in which the network configuration is known and it can be determined ahead of time that additional processing is not required. For example, for rule "2," assume that the network administrator knows each of the possible source or destination IP addresses that may be placed using the relevant labels for rule 2. Further, assume that none of these IP addresses uses bits 97-128 of the source IP address field (or all of the IP addresses have the same value for this field). In this situation, the VLAN tag may be safely inserted at this location and no additional "compression" processing may be necessary. In other situations, additional processing may be necessary to ensure address information is not lost. For example, for rule "1," compression field 525 is designated as "YES," indicating that some compression may be necessary. In this case, field 525 may include additional information describing (or linking to) a specification of the compression technique.

Figure 6:
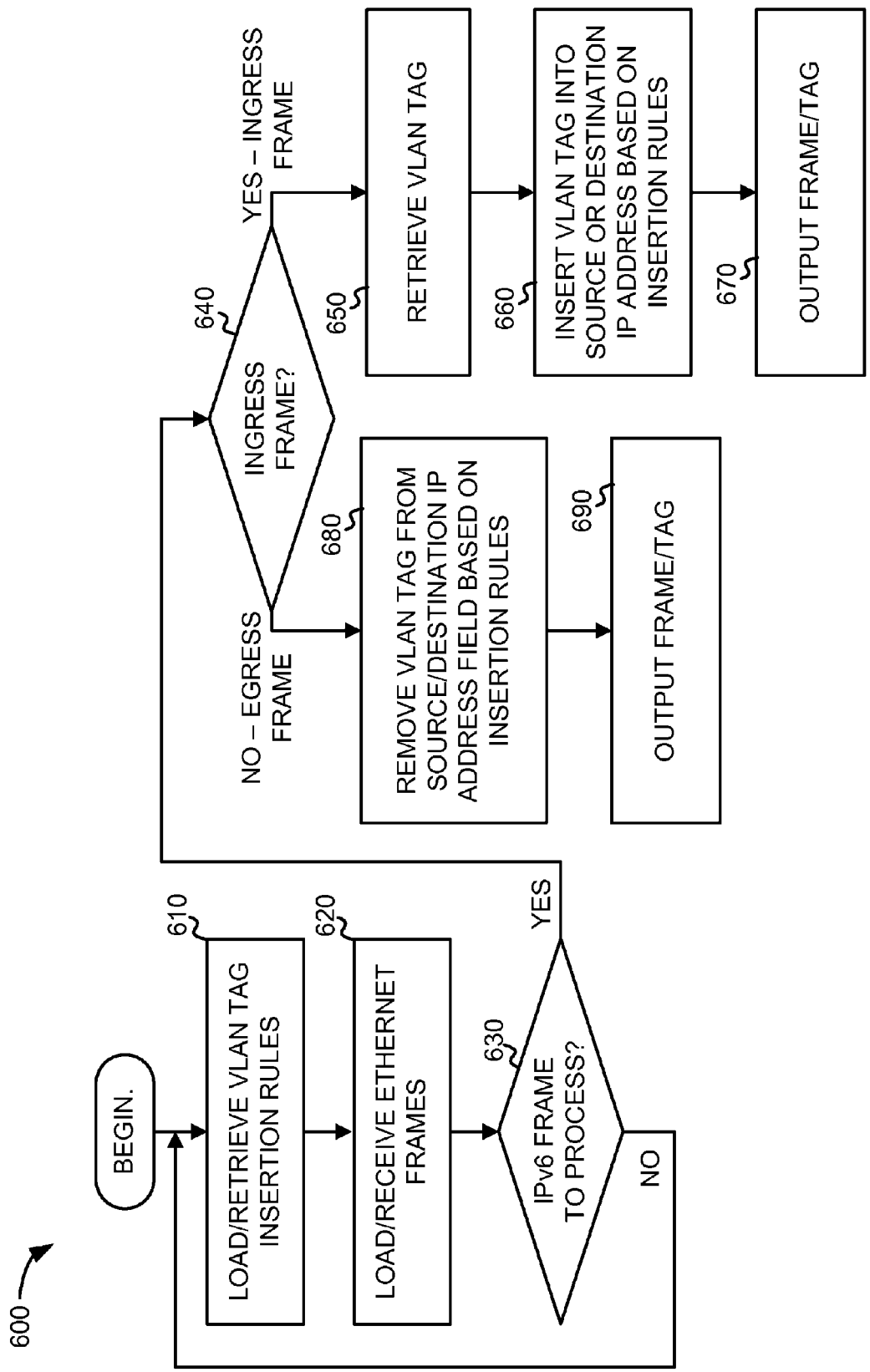
FIG. 6 is a diagram illustrating an exemplary process for embedding and extracting VLAN tags in source or destination address fields of an IPv6 Ethernet frame.

FIG. 6 is a diagram illustrating an exemplary process 600 for embedding and extracting VLAN tags in source IP address fields or destination IP address fields of an IPv6 Ethernet frame. Process 600 may be performed by one or more components of network device 200. For example, Ethernet frames identification component 410, VLAN tag embedding component 420, VLAN tag extractor component 430, and VLAN tag manager component 440 may collectively implement process 600.

Process 600 may begin by loading or retrieving VLAN tag insertion rules (block 610). For example, network device 200 may retrieve VLAN tag insertion rules 460 that define how VLAN tags may be inserted and extracted from the destination or source IPv6 address fields of received Ethernet frames.

Ethernet frames may be loaded or received (block 620) and it may be determined if an IPv6 frame requires processing (block 630). For example, network device 200 may receive an incoming Ethernet frame from an endpoint or another network device in network 140. Ethernet frames identification component 410 may check if the Hex decimal content for an EtherType field is that of an IPv6 payload type (e.g., "0x86DD"). A frame may be processed if the frame is determined to be a VLAN frame entering or exiting network 140. When there is a new frame to process, (block 630—YES), it may be determined whether the new frame is an ingress frame or an egress frame (block 640). An ingress frame may include an Ethernet frame that is being placed into network 140 by network device 200. A frame may be determined to be an ingress frame based on, for example, fields (e.g., leading frame information 310) in the Ethernet frame. For example, frames originating from certain source MAC addresses may be identified by a network device 200 as ingress frames. Conversely, frames destined to certain destination MAC addresses may be identified by a network device 200 as egress frames. Egress processing of a frame may generally include removing the VLAN tag from the IPv6 payload of the Ethernet frame and forwarding the frame to its destination MAC address.

When the received frame is an ingress frame (block 640—YES), a VLAN tag may be retrieved (block 650). For example, VLAN tag embedding component 420 may retrieve the VLAN tag appropriate for the frame and may process the frame to add the new VLAN tag to the source/destination IP address of the IPv6 payload. In one implementation, VLAN tag embedding component 420 may include or communicate with a loading component to receive and store a plurality of VLAN tags that are to be used to create VLANs in network 140.

The VLAN tag determined in block 650 may next be inserted into the frame in the source/destination IP address of the IPv6 payload, based on insertion rules (block 660). For example, assume that for a particular ingress frame, rule "2" in table 500 is determined to apply to the VLAN tag. In this case, the VLAN tag may be embedded within the frame's IPv6 payload at bits 97-128 of destination IP address field 346.

The frame, including the embedded VLAN tag, may next be output to a VLAN tag manager component (block 670). For example, VLAN tag embedding component 420 may forward the frame/VLAN tag to VLAN tag manager component 440. VLAN tag manager component 440 may serve as an interface for the next stage for processing of the frame within network device 200. For instance, VLAN tag manager component 440 may handle forwarding of the frame to the output port of the network device corresponding to the embedded VLAN tag. Alternatively, VLAN tag manager component 440 may forward the frame to a next processing stage in network device 200.

Referring back to block 640, when the received frame is an egress frame (block 640—NO), the VLAN tag may be removed from the source and/or destination IP address field, based on the insertion rules (block 680). For example, VLAN tag extractor component 430 may remove the VLAN tag according to the insertion rules (e.g., VLAN tag insertion rules 460) so that the source/destination IP address is restored to its original value. For example, for certain insertion rules, the replaced portion of the source and/or destination portion of the IP address may be a section of the address in which all the frames have the same value for this section of the address. In this situation, VLAN tag extractor component 430 may substitute the value into the address and the substitution to perform may be specified in, for example, compression field 525 for the insertion rule. Alternatively, in some implementations, the network administrator may determine that the section of IP address used for the VLAN tag may not be needed to deliver the frame to its end-destination, and accordingly, the VLAN tag may be left in the source/destination IP address.

The frame, excluding the embedded VLAN tag, may next be output to the VLAN tag manager component (block 690). For example, VLAN tag extractor component 430 may forward the frame to VLAN tag manager component 440. VLAN tag manager component 440 may serve as an interface for the next stage for processing of the frame within network device 200. For instance, VLAN tag manager component 440 may handle forwarding of the frame to the output port of the network device corresponding to the embedded VLAN tag. Alternatively, VLAN tag manager component 440 may forward the frame to a next processing stage in network device 200.

Implementations described herein may provide systems and/or methods that may receive an Ethernet frame sent from an originating device toward a destination device, may determine whether the frame includes an IPv6 payload, and may determine whether the frame is one of an ingress frame or an egress frame for a virtual local area network (VLAN). The systems and/or methods may determine a VLAN tag for the frame when the frame is an ingress frame and may insert the VLAN tag in a portion of a source IP address field or a destination IP address field of the IPv6 payload, when the frame is an ingress frame. The systems and/or methods may extract a VLAN tag from a portion of the source IP address field or a destination IP address field of the IPv6 payload, when the frame is an egress frame. The systems and/or methods may then output the frame to one of the VLAN or the destination device.

The foregoing description provides illustration and description, but is not intended to be exhaustive or to limit the invention to the precise form disclosed. Modifications and variations are possible in light of the above teachings or may be acquired from practice of the invention.

While a series of blocks has been described with regard to FIG. 6, the order of the blocks may be modified in other embodiments. Further, non-dependent blocks may be performed in parallel.

It will be apparent that embodiments, as described herein, may be implemented in many different forms of software, firmware, and hardware in the embodiments illustrated in the figures. The actual software code or specialized control hardware used to implement embodiments described herein is not limiting of the invention. Thus, the operation and behavior of the embodiments were described without reference to the specific software code—it being understood that software and control hardware may be designed to implement the embodiments based on the description herein.

Further, certain portions, described above, may be implemented as a component that performs one or more functions. A component, as used herein, may include hardware, such as a processor, ASIC, or FPGA, or a combination of hardware and software (e.g., a processor executing software).

No element, act, or instruction used in the present application should be construed as critical or essential unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:
1. A method comprising:
receiving, by a network device, an Ethernet frame that includes an Internet Protocol version 6 (IPv6) payload;

determining, by the network device, whether the Ethernet frame is an ingress frame or an egress frame for a virtual local area network (VLAN);
determining, by the network device, a VLAN tag for the Ethernet frame when the frame is the ingress frame;
inserting, by the network device and when the Ethernet frame is the ingress frame, a first portion of the VLAN tag into a source internet protocol (IP) address field of the IPv6 payload and a second portion of the VLAN tag into a destination IP address field of the IPv6 payload;
outputting the Ethernet frame to the VLAN based on the first portion of the VLAN tag and the second portion of the VLAN tag; and
repairing, by the network device, at least one of the source IP address field of the IPv6 payload or the destination IP address field of the IPv6 payload to match an original address for the Ethernet frame when the Ethernet frame is the egress frame.

2. The method of claim 1, further comprising:
determining, by the network device, whether another Ethernet frame includes another IPv6 payload;
determining, by the network device, whether the other Ethernet frame is an egress frame for the VLAN when the other Ethernet frame includes the other IPv6 payload; and
removing a different VLAN tag from at least one of a different source IP address field of the other Ethernet frame or a different destination IP address field of the other Ethernet frame when the other Ethernet frame is the egress frame.

3. The method of claim 1, further comprising:
inserting, into a different portion of the IPv6 payload that precedes the VLAN tag, an indicator to indicate that the inserting of the VLAN tag has occurred.

4. The method of claim 3, where the indicator includes a bit flipped to flag that the VLAN tag is inserted.

5. The method of claim 1, where the source IP address field is a 128-bit address field.

6. The method of claim 1, where inserting the first portion of the VLAN tag and the second portion of the VLAN tag includes:
receiving rules that define how VLAN tags are to be included in IPv6 payloads, and
inserting, based on one or more of the rules, the first portion of the VLAN tag into the source IP address field of the IPv6 payload and the second portion of the VLAN tag into the destination IP address field of the IPv6 payload.

7. The method of claim 6, where the rules include one or more of:
rules defining VLAN tags that are to be inserted into one or more of the source IP address field or the destination IP address field, or
rules defining one or more locations in one or more of the source IP address field or the destination IP address field where the VLAN tags are to be inserted.

8. The method of claim 6, further comprising:
distributing the rules to other network devices by using a network discovery protocol.

9. The method of claim 1, where the network device is an edge switch or an edge router.

10. A network device comprising:
one or more processors to:
receive a plurality of virtual local area network (VLAN) tags that are to be used to create VLANs in a network;
receive a frame;
determine that the frame is an ingress frame or an egress frame;
insert, after determining that the frame is the ingress frame, a first portion of a particular VLAN tag, of the plurality of VLAN tags, into a source internet protocol (IP) address field of an IP payload of the frame and a second portion of the particular VLAN tag into a destination IP address field of the IP payload;
provide the frame for further processing based on the first portion of the VLAN tag and the second portion of the VLAN tag; and
repair at least one of the source IP address field or the destination IP address field to match an original address for the frame when the frame is the egress frame.

11. The network device of claim 10, where the IP payload is an Internet Protocol version 6 (IPv6) payload.

12. The network device of claim 10, where, when inserting the first portion of the particular VLAN tag and the second portion of the particular VLAN tag, the one or more processors are to:
receive one or more insertion rules that define how the plurality of VLAN tags are to be inserted, and
insert, based on the one or more insertion rules, the first portion of the particular VLAN tag into the source IP address field of the IP payload and the second portion of the particular VLAN tag into the destination IP address field of the IP payload.

13. The network device of claim 12, where the rules include one or more of:
rules defining one or more of the plurality of VLAN tags that are to be inserted into the IP payload, or
rules defining one or more locations in one or more of the source IP address field or the destination IP address field where the one or more of the plurality of VLAN tags are to be inserted.

14. A method comprising:
receiving, by a network device, an Ethernet frame;
determining, by the network device, that the Ethernet frame is egressing from a virtual local area network (VLAN);
removing, by the network device and after determining that the Ethernet frame is egressing from the VLAN, a first portion of a VLAN tag from a source internet protocol (IP) address field of an IP payload of the Ethernet frame;
removing, by the network device and after determining that the Ethernet frame is egressing from the VLAN, a second portion of the VLAN tag from a destination IP address field of the IP payload;
repair at least one of the source IP address field or the destination IP address field to match an original address for the Ethernet frame; and
outputting, by the network device, the Ethernet frame with the first portion of the VLAN tag and the second portion of the VLAN tag removed.

15. The method of claim 14, where the IP payload is an Internet Protocol version 6 (IPv6) payload.

16. The method of claim 14, where removing the first portion of the VLAN tag includes:
receiving rules that define how VLAN tags are to be removed, and
removing the first portion of the VLAN tag based on the rules.

17. The method of claim 16, where the rules include one or more of:
rules defining VLAN tags that are to be inserted into or removed from one or more of the source IP address field or the destination IP address field, or rules defining one or more locations in one or more of the source IP address field or the destination IP address field where the VLAN tags are to be inserted or removed.

18. A network device comprising:
one or more processors to:
receive an Ethernet frame that includes an Internet Protocol version 6 (IPv6) payload, determine whether the Ethernet frame is an ingress frame or an egress frame for a virtual local area network (VLAN),
determine a VLAN tag for the Ethernet frame when the frame is the ingress frame, insert, when the Ethernet frame is the ingress frame, a first portion of the VLAN tag into a source internet protocol (IP) address field of the IPv6 payload and a second portion of the VLAN tag into a destination IP address field of the IPv6 payload,
output the Ethernet frame to one of the VLAN or a destination device based on the first portion of the VLAN tag and the second portion of the VLAN tag, and
repair at least one of the source IP address field or the destination IP address field to match an original address for the Ethernet frame when the Ethernet frame is an egress frame.

19. The method of claim 14, where the original address is a source address originally included in the source IP address field.

* * * * *